Figure 1:
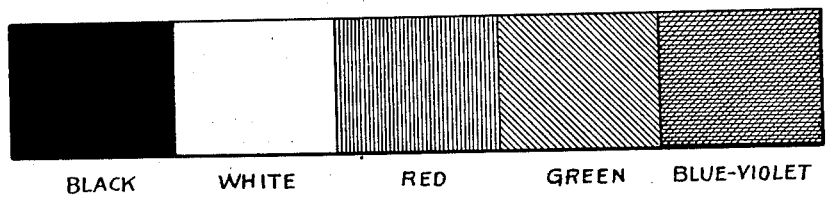

Feb. 14, 1928.

L. D. MANNES ET AL 1,659,148

COLOR PHOTOGRAPH AND METHOD FOR PRODUCING SAME

Filed Aug. 4, 1923      2 Sheets-Sheet 1

Object Photographed

BLACK    WHITE    RED    GREEN    BLUE-VIOLET

Plate before Exposure

After Exposure and Development

After Bleaching

After Redevelopment of upper Layer.

INVENTOR
Leopold D. Mannes
Leopold Godowsky Jr.
BY
Pennie Davis Marvin & Edmonds
ATTORNEY Feb. 14, 1928.

L. D. MANNES ET AL 1,659,148

COLOR PHOTOGRAPH AND METHOD FOR PRODUCING SAME

Filed Aug. 4, 1923    2 Sheets-Sheet 2

Fig. 6.

BLUE TONING OF LOWER IMAGE

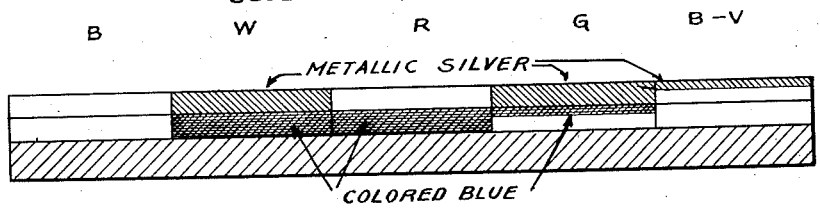

Fig. 7.

FINISHED NEGATIVE

After Mordanting and double Dyeing (Magenta and Yellow) of upper Layer.
Yellow takes on Surface. (Colors reversed)

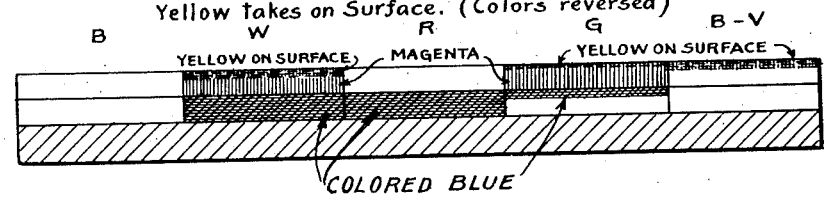

Fig. 8.

Combined Colors of 2 Layers (Negative)

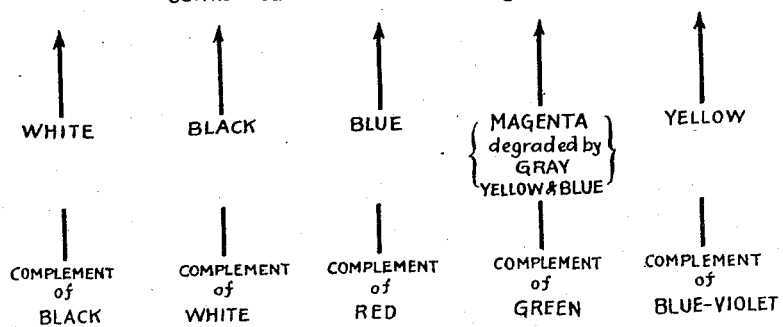

| WHITE | BLACK | BLUE | MAGENTA degraded by GRAY YELLOW & BLUE | YELLOW |
|---|---|---|---|---|
| COMPLEMENT of BLACK | COMPLEMENT of WHITE | COMPLEMENT of RED | COMPLEMENT of GREEN | COMPLEMENT of BLUE-VIOLET |

Fig. 9.

FINISHED POSITIVE

PRINTED FROM FINISHED NEGATIVE AND TREATED SIMILARLY

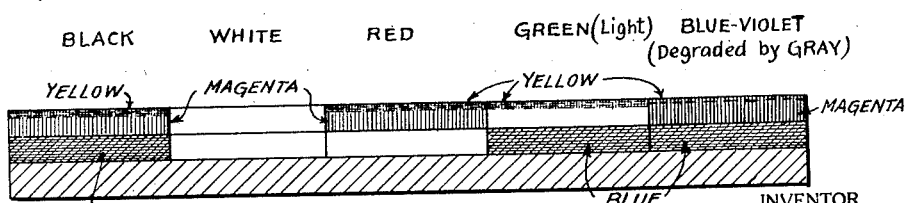

INVENTOR

BY

ATTORNEY

Patented Feb. 14, 1928.

1,659,148

UNITED STATES PATENT OFFICE.

LEOPOLD D. MANNES AND LEOPOLD GODOWSKY, JR., OF NEW YORK, N. Y.

COLOR PHOTOGRAPH AND METHOD FOR PRODUCING SAME.

Application filed August 4, 1923. Serial No. 655,766.

The present invention relates to the art of color photographs and has to do with a color photograph and a process of producing the photograph in substantially the natural colors of the subject. More particularly this invention is an improvement and further development over the process for color photographs disclosed in our patent Number 1,516,824, dated November 25, 1924, on co-pending application Serial No. 620,269, filed February 20, 1923.

Color photographs and motion pictures in colors are commonly produced by a two or three color process. With a three color process practically any subject photographed is satisfactorily reproduced, that is, the coloring on the picture occurs in substantially the same intensity and with substantially the same distribution as do the corresponding color sensations in the original subject. The two color process is satisfactory for many subjects but it has certain well defined limitations and cannot therefore be used successfully under all conditions. The one objection to the use of the three color process is difficulty of manipulation. Three-color pictures taken by alternately exposing the subject to record the different color values are open to the objection that color fringe is practically unavoidable, particularly when the objects photographed are in motion. It has also been proposed to produce photographs by a three color process wherein the respective color sensations are simultaneously recorded at a single exposure. Methods of this nature have not, however, been developed so that they are available in the production of color pictures on a commercial scale.

It is a principal object of this invention to provide a process for the production of pictures in colors which process retains the relative simplicity of a two color process but which at the same time produces results comparable in many respects with those produced by a three color process.

Specifically, it is an object of this invention to provide in connection with the two color process disclosed in our above mentioned patent, a manner of manipulation which, while not adding to the complexity or the difficulty of the process, has the effect of recording the color sensations in the subject somewhat after the fashion of a three color rendition with a corresponding improvement in the finished product.

Figure 2:
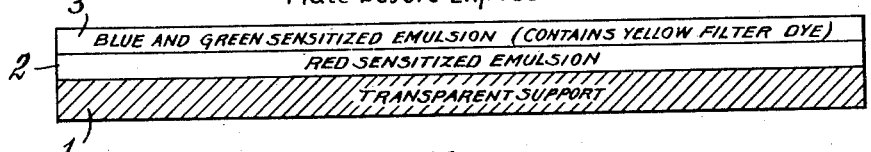
Figure 3:
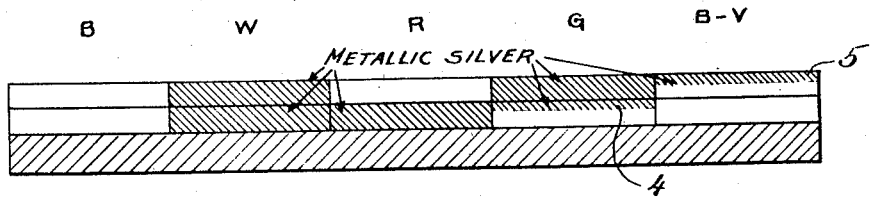
Figure 4:
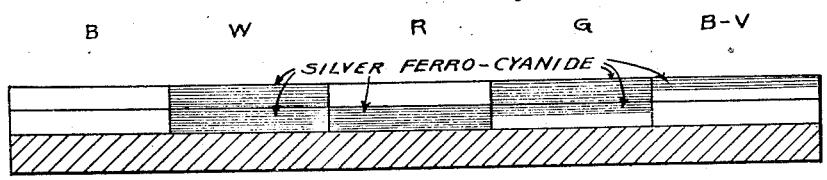
Figure 5:
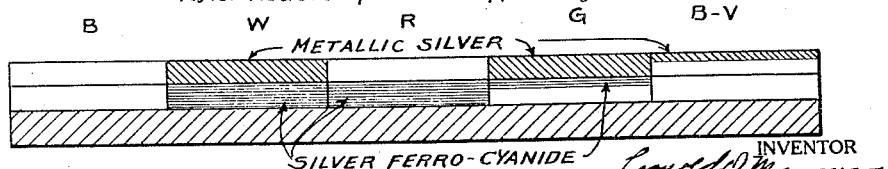

We have illustrated the various steps of the process in the accompanying drawings in which Figure 1 represents the object photographed here shown as a series of 5 rectangles colored black, white, red, green and blue-violet respectively; Figure 2 is a cross-sectional view taken thru the plate or film showing diagrammatically the structure of the plate or film before exposure; Figure 3 is a similar view showing the plate after exposure and development; Figure 4 shows the plate after the bleaching step; Figure 5 shows the plate after redevelopment of the upper layer of emulsion; Figure 6 shows the condition of the film after the lower image has been toned; Figure 7 illustrates the finished negative; Figure 8 is a chart illustrating the relation of the colors on the negative to the colors of the original subject and Figure 9 is a view showing the finished positive.

In carrying out our improved process we employ an appropriate transparent film or plate 1 of the usual type and provide this plate at one surface with two sensitized emulsions 2 and 3. The emulsion 2 immediately adjacent the film or plate is a fast silver bromide emulsion sensitized to record the orange-red sensations of the subject. The second coating or emulsion 3 is a slower silver bromide emulsion sensitized to record the blue-green of the spectrum, and coated directly on top of the first coating so that the entire body of the emulsion constitutes a substantial unitary layer. As described in our above mentioned patent, a strong yellow dye is incorporated in the upper emulsion for the purpose of absorbing the blue and violet rays thereby excluding these rays from the lower portion of the emulsion.

In pictures taken at a single exposure, the light entering the camera from the subject photographed, here shown as 5 adjacent rectangles colored black, white, red, green and blue-violet respectively, passes through the two emulsions on the plate or film and each of these emulsions records respectively the color values for which it has been sensitized. The result is that the layers of emulsion will contain images bearing the respective color sensations, the images being exactly superimposed.

The film may be developed by treating the two images successively or by developing both images at the same time. We prefer to completely develop both images. A suitable developer for this purpose is metol (mono - methylparaminophenol - sulphate). The condition of the developed plate is shown in Figure 3. It will be noted that the portion of the film recording the white of the subject bears a deposit of silver in both layers, the portion recording the black is not affected in either layer and the portion recording the red bears the deposit of silver only in the lower layer. The portion of the plate recording the green is affected throughout the upper layer and we have found that in practice the lower layer is affected to a certain extent as indicated at 4. The portion of the plate recording the blue-violet of the subject is affected only in the upper portion of the upper layer of emulsion as indicated at 5 for the reason that the provision of the yellow dye in the upper emulsion prevents penetration of the blue-violet rays throughout the entire upper layer of emulsion. After development, the developed images are bleached by immersion in a suitable bleaching solution such as for instance a solution of potassium ferricyanide, which converts the silver of the images to silver ferro-cyanide after the fashion indicated in Fig. 4. After bleaching the upper image is re-developed by the use of any well known photographic developer, such as a strong solution of diamidophenol. The condition of the plate at this stage of the process is indicated in Figure 5. The lower image is then colored. This portion of the emulsion was originally sensitized to record the orange-red sensations and is now colored blue by treatment with an iron toner such as ferrous chloride, as shown in Figure 6. Thus far the process is identical with the two color process disclosed in our above mentioned patent.

In the process of this invention, we have taken advantage of the fact that the color values of the subject photographed are recorded not only at the surface of the layer of emulsion sensitized to record those values, but occur to an appreciable depth in the emulsion. We have also taken advantage of the fact that it was desirable to incorporate into the upper emulsion a quantity of yellow dye for the purpose of absorbing the blue-violet color values. The yellow dye prevents any appreciable penetration of the blue-violet rays. For this reason these rays will be recorded only at the surface of the upper emulsion or will at least be concentrated very near the surface as indicated in the drawings and will not occur to any appreciable extent throughout the body of the emulsion. The entire upper coating is, however, sensitized to record as well the green of the spectrum and since the presence of the yellow dye does not exclude the green rays, the green values will be recorded more or less uniformly throughout the depth of the upper emulsion. The green record directly at the surface of the emulsion, that is, at the point where the blue-violet record is concentrated, will be slight for the reason that the green rays are relatively non-actinic. The density of the green image is procured by an accumulation of deposit throughout the entire layer of emulsion, that is, by recording the green values throughout the depth of the layer rather than by concentration at or near the surface. It will thus be seen that the orange-red sensations are recorded in the lower layer of emulsion, the green sensations are recorded throughout the depth of the upper layer of emulsion, and the blue sensations are recorded substantially entirely at the surface of the top layer.

After the exposed negative is completely developed and treated as above described, the plate contains the upper image developed as a black and white negative and the lower image colored blue. The upper image is now treated with a mordant suitable for use with basic dyes, such as, for instance, a cupric ferro-cyanide solution, to render the layer of gelatine selectively absorptive to the dye. This solution is a purely physical mixture of cupric chloride and potassium ferricyanide which leaves a deposit of cupric ferro-cyanide in place of the silver image and for this reason the solution is described as a cupric ferro-cyanide solution. The image is then dye-toned magenta, which, for the purpose of producing colored pictures, may be regarded as the complementary color of green. This dye-toning may be accomplished by an appropriate dye such as basic fuchsine (rosaniline hydro-chloride). The action of this dye is permitted to continue until the entire upper image has been colored. The plate or film is then immersed in a concentrated solution of a yellow basic dye such as thio-flavine T (described in Schultz "Farbstoff-Tabellen" under No. 618 as $C_{17}H_{19}N_2SCl.HCl$ prepared by methylating dehydro-thio-p-toluidin with methyl alcohol and hydrochloric acid or sulfuric acid in an autoclave at 170°). This dye has the effect of replacing the magenta color immediately at the surface of the upper layer of emulsion, that is, at the point where the blue sensations are recorded. At this stage of the process, therefore, the plate or film bears the record of the subject photographed in three colors, namely, blue, magenta and yellow. The distribution of the colors in the finished negative is indicated in Figure 7. The images are reversely colored, that is, each image is colored with the color which is substantially complementary with that whose values the image has recorded. This color reversal has been found to compensate for any inherent discrepancy of internal contrast characteristic of slow and fast emulsions. The positive is produced by exposure through the negative in the usual fashion. Only a single exposure is required. The same process is necessary to form the positive as has been described in the production of the negative, that is, the positive after being exposed through the negative is treated in exactly the fashion as just described in connection with the treatment of the negative. The reverse coloring must also be resorted to in the positive so that the finished picture will bear the proper distribution of color. The chart of Figure 8 considered in conjunction with the illustration of the finished negative in Figure 7 shows the color effects which are obtained by viewing the finished negative. The portion of the negative recording the black of the subject is white. The portion recording the white has its lower layer colored blue, its upper layer colored magenta and has an upper surface coloring of yellow. The resultant color noted by viewing this portion of the negative is black. The portion of the plate recording the red of the spectrum is colored blue. The portion recording the green of the spectrum has its upper layer colored magenta and has a surface coloring of yellow. Also this portion of the plate has a slight coloration of blue in the lower layer and the result is that this portion of the element appears to be colored magenta slightly degraded by gray. The degrading effect of gray is produced by the reason of the yellow at the surface of the upper emulsion and the blue at the surface of the lower layer of emulsion, which combined colors produce a gray. The portion of the plate recording the blue-violet of the subject has a coloring of yellow at the surface of the upper emulsion. The colors of the different portions of the negative are therefore white, black, blue, magenta (degraded slightly by gray) and yellow. These colors are complementary respectively to the colors of the original subject.

To assist in obtaining an effective color separation and thus most nearly approaching the results of a three color process, we have found it desirable to expose the negative through a trichroic filter. This filter is arranged to give two absorption bands for the purpose of accentuating the separation between the red, the green and the blue of the spectrum. The absorption bands may be made with rhodamine and fluoresceine. The effect is a separation of the spectrum into three sections containing respectively the three primary colors with the result that a more positive separation of color values is obtained on the photographic record.

We have found it desirable to employ a similar filter in printing the positive and have found it of advantage to have the absorption bands on this filter a little broader and a little more sharply defined.

It will thus be seen that the invention contemplates an approximate three-color rendition in a process which in character and difficulty of manipulation is essentially a two color process and which employs a film bearing a two layer emulsion, the layers of emulsion, however, being united together so that they constitute an essentially unitary body. Variations and modifications of the process above described may be made within the full scope of the appended claims.

We claim:

1. The method of producing a color photograph which comprises forming simultaneously at different depths in a single uniformly sensitized emulsion images recording different color values and subsequently differentially coloring the said images.

2. The method of producing a color photograph which comprises recording separately in a single layer of uniformly sensitized emulsion two different color values, the record of one of said values occurring substantially at the surface of the emulsion and the record of the other of said values occurring throughout the body of the emulsion and subsequently differentially coloring the images resulting from said respective color value records.

3. The method of producing an approximate three color photograph which comprises forming respectively in two superimposed layers of sensitized emulsion images recording respectively the color values for which the corresponding emulsion were sensitized and further effecting a color separation in one of said emulsions whereby certain of the color values are recorded at substantially the surface of that emulsion, while the remaining color values are recorded throughout the body of the emulsion.

4. A color photographic film or plate bearing an emulsion sensitized to record the color values of one portion of the spectrum, said emulsion being transparent to certain of said color values and being treated to restrict the remainder of said color values substantially to the surface of the emulsion.

5. A color photographic film or plate comprising an emulsion sensitized to the orange red of the spectrum, a second emulsion sensitized to the blue-green of the spectrum and colored yellow to thereby diminish the effect of the blue-violet values upon the body of the second emulsion.

6. A color photographic film or plate comprising an emulsion sensitized to the orange red of the spectrum, a second emulsion sensitized to the blue-green of the spectrum and having incorporated therein a yellow dye for the purpose of restricting the blue-violet record to the surface of the second emulsion, but permitting a green record throughout the body of the said second emulsion.

7. The method of producing an approximate three color photograph which comprises forming in two superimposed layers of sensitized emulsion images recording respectively the color values for which the corresponding emulsions were sensitized, the upper layer being sensitized for the blue-green of the spectrum and having incorporated in it a yellow dye to thereby restrict the blue-violet values to the surface of the upper layer and at the same time permit the green values to penetrate the body of the upper layer, said film being exposed through a trichroic filter having very light color bands to thereby exaggerate the separation of the three primary colors.

8. The method of producing an approximate three color photograph which comprises forming in two superimposed layers of sensitized emulsion images recording respectively the color values for which the corresponding emulsions were sensitized, the upper layer being sensitized for the blue-green of the spectrum and having incorporated in it a yellow dye to thereby restrict the blue-violet values to the surface of the upper layer and at the same time permit the green values to penetrate the body of the upper layer and coloring the image recording the orange red sensations blue, that recording the green sensations magenta, and that recording blue sensations yellow.

9. The method of producing an approximate three color photograph which comprises forming in two superimposed layers of sensitized emulsion images recording respectively the color values for which the corresponding emulsions were sensitized, the upper layer being sensitized for the blue-green of the spectrum and having incorporated in it a yellow dye to thereby restrict the blue-violet values to the surface of the upper layer and at the same time permit the green values to penetrate the body of the said upper layer, coloring the image recording the orange red sensations blue, and that recording the blue-violet sensations yellow, and that recording the green sensations magenta, then similarly forming a positive by exposure through the negative thus obtained, the said exposure being made through a trichroic filter having well defined color bands to thereby exaggerate the separation of the three primary colors, and then coloring the resulting images differentially to form the complete positive.

10. The method of producing a photographic record in three colors, comprising forming in suitably sensitized emulsion three superimposed images recording respectively different color values, the exposure being made through a trichroic filter to thereby exaggerate the separation of the color values recorded respectively by the said superimposed images.

In testimony whereof we affix our signatures.

LEOPOLD D. MANNES.
LEOPOLD GODOWSKY, Jr.